United States Patent
Doshi

(10) Patent No.: US 9,807,079 B2
(45) Date of Patent: Oct. 31, 2017

(54) SINGLE SIGN ON PROXY FOR REGULATING ACCESS TO A CLOUD SERVICE

(71) Applicant: Palo Alto Networks, Inc., Santa Clara, CA (US)

(72) Inventor: Nishant Doshi, Sunnyvale, CA (US)

(73) Assignee: Palo Alto Network, Inc., Santa Clara, CA (US)

( * ) Notice: Subject to any disclaimer, the term of this patent is extended or adjusted under 35 U.S.C. 154(b) by 0 days.

(21) Appl. No.: 14/921,655

(22) Filed: Oct. 23, 2015

(65) Prior Publication Data

US 2016/0119325 A1    Apr. 28, 2016

Related U.S. Application Data

(60) Provisional application No. 62/067,765, filed on Oct. 23, 2014.

(51) Int. Cl.
*G06F 7/04* (2006.01)
*H04L 29/06* (2006.01)
*H04L 29/08* (2006.01)
*H04W 4/02* (2009.01)

(52) U.S. Cl.
CPC ...... *H04L 63/0815* (2013.01); *H04L 63/0281* (2013.01); *H04L 67/02* (2013.01); *H04L 67/04* (2013.01); *H04L 67/10* (2013.01); *H04L 67/28* (2013.01); *H04W 4/021* (2013.01); *H04L 67/18* (2013.01); *H04L 67/20* (2013.01)

(58) Field of Classification Search
CPC ............. G06F 2221/2111; G06F 21/41; H04L 29/06768

USPC ........................................................... 726/7
See application file for complete search history.

(56) References Cited

U.S. PATENT DOCUMENTS

| | | | | |
|---|---|---|---|---|
| 2006/0129816 A1* | 6/2006 | Hinton | ................ | H04L 63/0815 713/169 |
| 2014/0032759 A1* | 1/2014 | Barton | .................... | H04L 67/10 709/225 |
| 2014/0096186 A1* | 4/2014 | Barton | .................... | H04L 67/10 726/1 |
| 2015/0089579 A1* | 3/2015 | Manza | ................ | H04L 63/0838 726/1 |
| 2015/0089620 A1* | 3/2015 | Manza | ................ | H04L 63/0838 726/8 |

(Continued)

OTHER PUBLICATIONS

Pashalidis et al, Impostor: A Single Sign-On System for Use from Untrusted Devices, 2004, IEEE, pp. 2191-2195.*

(Continued)

*Primary Examiner* — Luu Pham
*Assistant Examiner* — Jenise Jackson

(57) ABSTRACT

Embodiments disclosed herein provide systems, methods, and computer readable media for using a single sign-on proxy to regulate access to a cloud service. In a particular embodiment, a method provides receiving an authentication request from a user system directed to a SSO service and determining whether the authentication request satisfies at least one criterion for allowing access to the cloud service associated with the SSO service. Upon determining that the authentication request satisfies the at least one criterion, the method provides forwarding the authentication request to the SSO service.

14 Claims, 6 Drawing Sheets

(56) References Cited

U.S. PATENT DOCUMENTS

| | | | |
|---|---|---|---|
| 2015/0121496 A1* | 4/2015 | Caldeira De Andrada | H04L 63/08 |
| | | | 726/7 |
| 2016/0036855 A1* | 2/2016 | Gangadharappa | H04L 63/20 |
| | | | 726/1 |
| 2016/0087970 A1* | 3/2016 | Kahol | H04L 63/0281 |
| | | | 726/8 |
| 2016/0234209 A1* | 8/2016 | Kahol | H04L 63/0869 |

OTHER PUBLICATIONS

Cardoso et al, An Authentication Middleware for Squid Proxy-Cache: A Single Sign-On Approach, 2012, IEEE, pp. 138-141.*

* cited by examiner

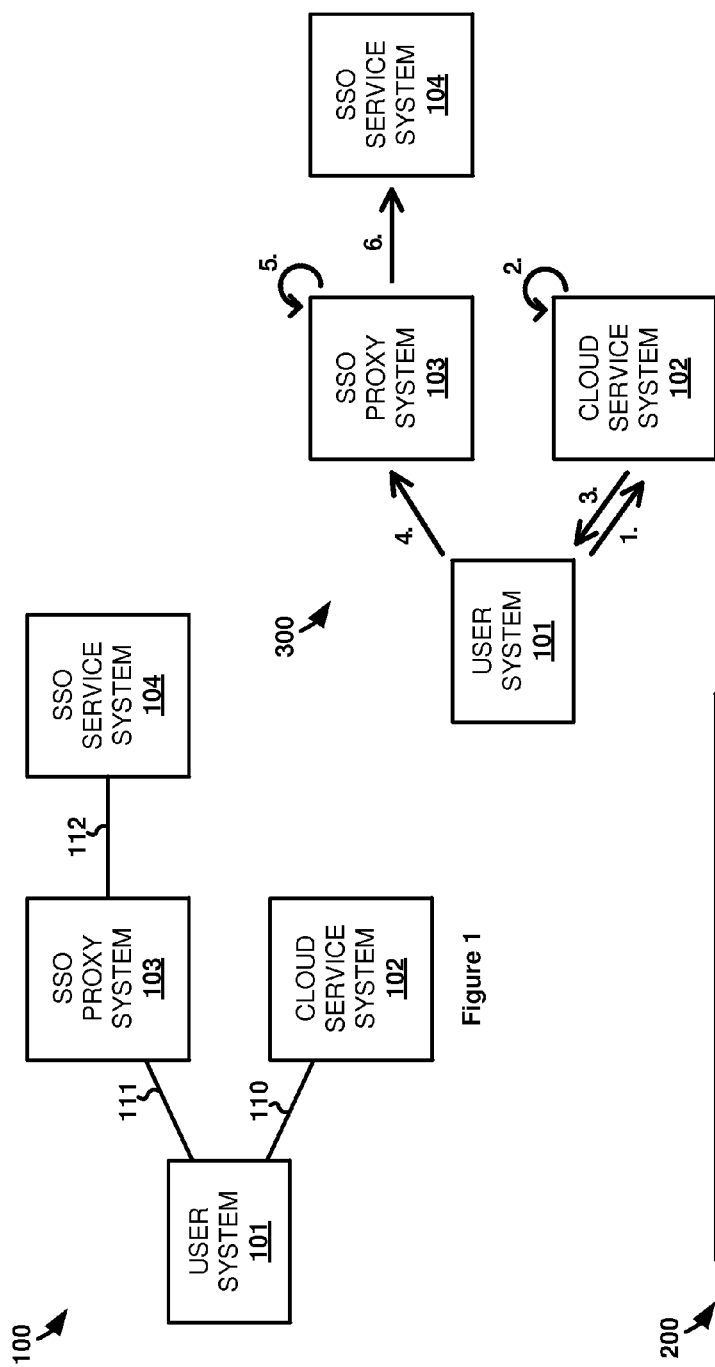

SINGLE SIGN ON PROXY FOR REGULATING ACCESS TO A CLOUD SERVICE

RELATED APPLICATIONS

This application is related to and claims priority to U.S. Provisional Patent Application No. 62/067,765, entitled "SINGLE SIGN ON PROXY FOR REGULATING ACCESS TO A CLOUD SERVICE," filed on Oct. 23, 2014, and which is hereby incorporated by reference in its entirety.

TECHNICAL BACKGROUND

Cloud computing is becoming more prevalent as a cost effective and decentralized computing platform for individuals, businesses, or other type of entity. Some of the more basic cloud computing services store files so that the files can be accessed from any computer system that is able to log into the cloud computing service that stores the files. More complex cloud computing services provide a remote platform for providing their services to customers. These more complex cloud computing services are sometimes referred to as Software as a Service (SaaS), Platform as a Service (PaaS), and Infrastructure as a Service (IaaS).

In some cases, multiple cloud computing services may be used by an entity. Each of the multiple cloud computing services may authenticate users via login credentials, such as usernames and passwords. Depending on the number of cloud computing services in use, the amount of different login credentials that a user needs to manage may be a large number. Moreover, regardless of the amount of different login credentials, it may be tedious for the user to have to log into each individual cloud computing service. As such, single sign-on (SSO) services may be used to authenticate a user once for accessing multiple cloud services.

OVERVIEW

Embodiments disclosed herein provide systems, methods, and computer readable media for using a single sign-on proxy to regulate access to a cloud service. In a particular embodiment, a method provides receiving an authentication request from a user system directed to a SSO service and determining whether the authentication request satisfies at least one criterion for allowing access to the cloud service associated with the SSO service. Upon determining that the authentication request satisfies the at least one criterion, the method provides forwarding the authentication request to the SSO service.

In some embodiments, the at least one criterion includes a geographic location limitation, and the method further provides determining whether the authentication request was received from a geographic location that satisfies the geographic location limitation.

In some embodiments, determining whether the authentication request was received from a geographic location that satisfies the geographic location limitation comprises identifying a network address from which the authentication request was received and identifying the geographic location associated with the network address.

In some embodiments, the at least one criterion includes a time limitation, and the method further provides determining whether the authentication request was received at a time that satisfies the time limitation.

In some embodiments, the at least one criterion includes a device type limitation, and the method further provides determining whether the user system satisfies the device type limitation.

In some embodiments, the at least one criterion includes an application limitation, and the method further provides determining whether a Uniform Resource Locator (URL) included in the authentication request satisfies the application limitation.

In some embodiments, after the SSO service authenticates the authentication request, the method provides determining that the at least one criterion is no longer satisfied. Also, upon determining that the at lease one criterion is no longer satisfied, the method provides transferring a sign-off request to the SSO service.

In some embodiments, the at least one criterion comprises a first criterion upon which satisfaction of a second criterion depends.

In some embodiments, upon determining that the authentication request does not satisfy the at least one criterion, the method provides transferring a notification to the user system indicating that the authentication request was not forwarded to the SSO service.

In some embodiments, the notification further indicates a reason that the authentication request was not forwarded to the SSO service.

In another embodiment, a SSO proxy system is provided that includes a communication interface and a processing system. The communication interface is configured to receive an authentication request from a user system directed to a SSO service. The processing system is configured to determine whether the authentication request satisfies at least one criterion for allowing access to the cloud service associated with the SSO service and, upon determining that the authentication request satisfies the at least one criterion, forward the authentication request to the SSO service.

In yet another embodiment, computer readable storage medium having instructions stored thereon is provided. The instructions, when executed by a SSO proxy system, direct the SSO proxy system to receive an authentication request from a user system directed to a SSO service and determine whether the authentication request satisfies criteria for allowing access to the cloud service associated with the SSO service. Upon determining that the authentication request satisfies the criteria, the instructions direct the SSO proxy system to forward the authentication request to the SSO service.

BRIEF DESCRIPTION OF THE DRAWINGS

FIG. 1 illustrates a computing environment for using a single sign-on proxy to regulate access to a cloud service.

FIG. 2 illustrates an operation of the computing environment to use a single sign-on proxy to regulate access to a cloud service.

FIG. 3 illustrates an operational scenario for using a single sign-on proxy to regulate access to a cloud service.

DETAILED DESCRIPTION

Figure 4:
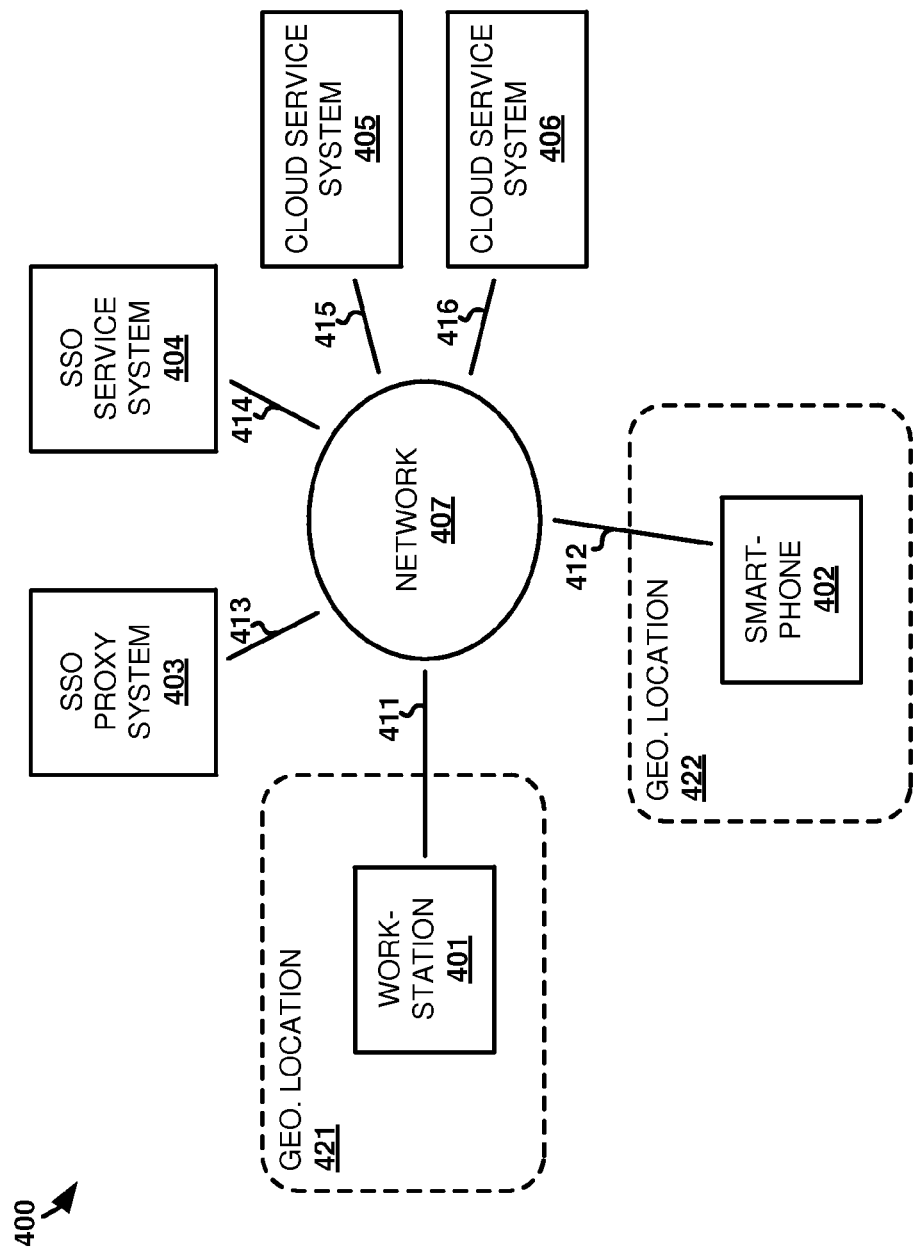
FIG. 4 illustrates another computing environment for using a single sign-on proxy to regulate access to a cloud service.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provides for regulating access to a cloud service using a proxy to a single sign-on (SSO) service. SSO services are used to provide authorization on behalf of systems that require proper credentials, such as username and password, or other type of authorization from a devices in order to grant access to the systems. As is implied by the SSO designation, SSO services allow for multiple systems or services to be accessed using a single set of credentials.

For example, a user may set up a username and password with an SSO service. The user may then use those credentials to access multiple services that accept authorization from the user's SSO service, such as email, social networking, remote file storage, or any other type of Software as a Service (SaaS), Platform as a service (PaaS), or Infrastructure as a Service (IaaS)—including combinations thereof. Through the use of the SSO service, the user does not have to maintain separate credentials for each service.

The SSO proxy described herein provides additional features to an SSO service. Specifically, while an SSO service is able to authorize user devices based on credentials, the SSO proxy regulates whether the SSO service can even be accessed based on additional criteria. For example, the SSO proxy may regulate access to the SSO service based on time, location, type of device, or other criteria that can be gleaned from a SSO authorization request.

FIG. 1 illustrates a computing environment 100 in which a SSO proxy regulates access to a cloud service. Computing environment 100 includes user system 101, cloud service system 102, SSO proxy system 103, and SSO service system 104. User system 101 and cloud service system 102 communicate over communication link 110. User system 101 and SSO proxy system 103 communicate over communication link 111. SSO proxy system 103 and SSO service system 104 communicate over communication link 112. While shown separately, the functionality of SSO proxy system 103 may be integrated into SSO service system 104.

In operation, cloud service system 102 provides a service to user systems, such as user system 101, such as a file storage and sharing, document collaboration, client and customer management services, cloud based operating system execution, or any other possible SaaS, PaaS, or IaaS that may be provided to a user via a remote computing system. Example cloud services include services provided by BOX, DROPBOX, SALESFORCE, YAMMER, FACEBOOK, EVERNOTE, or the like. Though not shown, user system 101 would likely access systems 102-104 over one or more communication networks, including the Internet.

SSO service system 104 provides an SSO service to users of at least the service provided by cloud service system 101. SSO service system 104 may further provide SSO service to other services that are not shown for clarity. When user system 101 requests access to cloud service system 102, user system 101 is directed to the SSO service for authorization. SSO proxy system 103 acts as an intermediary to SSO service system 104 in order to provide additional criteria for authorizing user system 101 access to cloud service system 102. If a request for SSO authorization directed to SSO service system 104 does not satisfy the criteria of SSO proxy system 103, then SSO proxy system 103 can prevent SSO service system 104 from acting upon the request. Thus, if SSO service system 104 cannot act upon an SSO request from user system 101, then user system 101 cannot be authorized to access cloud service 102 even if the credentials provided by user system 101 would have otherwise been authorized by SSO service system 104.

FIG. 2 illustrates operation 200 of computing environment 100 in which a SSO proxy regulates access to a cloud service. Operation 200 includes SSO proxy system 103 receiving an authentication request from user system 101 directed to an SSO service provided by SSO service system 102 (step 201). SSO proxy system 103 may be arranged in a network with SSO service system 104 such that any request to SSO service system 104 must pass through SSO proxy system 103 or the authorization request may be directed to SSO proxy system 103 in some other way. For example, cloud service system 102 may direct user system 101 to transfer authentication requests to SSO proxy system 103 in place of SSO service system 104.

SSO proxy system 103 then determines whether the authentication request satisfies at least one criterion for allowing access to the cloud service associated with the SSO service (step 202). The at least one criterion may include time limitations on when user system 101 is allowed to access the cloud service, limitations on where user system 101 can access the cloud service, limitations on what type of device(s) can access the cloud service, limitations on the frequency in which the cloud service can be accessed, or attempted to be accessed, by user system 101, or any other limitations whereby compliance with those limitations can be determined from the SSO access request. The at least one criterion may be set by an administrator of the SSO proxy system 103, such as a company's system administrator that regulates employees' abilities to access cloud service system 102.

In some embodiments, the at least one criterion may differ for different users. For example, the at least one criterion used to limit one user's access may be more lenient than at least one criterion used to limit another user's access. The user may be determined based on information included in the authentication request. For instance, a username may be included in the authentication request that identifies the user to SSO proxy system 103. SSO proxy system 103 can then select the appropriate at least one criterion based on the identity of that user.

Upon determining that the authentication request satisfies the at least one criterion, SSO proxy system 103 forwards the authentication request to SSO service system 104 (step 204). That is, if SSO proxy system 103 determines that the authentication request fits within the limitations provided in the at least one criterion, then SSO proxy system 103 allows the authentication request to reach SSO service system 104. SSO service system 104 can then process the authentication request as it normally would to determine whether user system 101 can access cloud service system 102. In some examples, the credentials necessary to authenticate user system 101 are included in the authorization request while in other examples SSO system 104 may have to request the credentials in response to receiving the authentication request.

Conversely, in some examples, if SSO proxy system 103 determines that the authentication request violates the limitations of the at least one criterion, then SSO proxy system 103 does not pass the authentication request to SSO service system 104. If the authentication request is not passed to SSO service system 104, then SSO proxy system 103 may simply allow user system 101 to timeout or may send a response to user system 101 indicating that the authorization request failed. In some cases, the response may indicate why the authentication request did not satisfy the criteria.

FIG. 3 illustrates operational scenario 300 whereby systems 101-104 of computing environment 100 perform to regulate access to a cloud service. In operational scenario 300, a user directs user system 101 to access a cloud service provided by cloud service system 102. Responsively, user system 101 requests access from cloud service system 102 at step 1. Upon receiving the request from user system 101, at step 2 cloud service system 102 determines that authorization for user system 101 should be handled by a SSO service system 104. This determination may be based on the user system from which the request is received, the account into which access is requested, a user that is making the request (which may be identified within the request), or by some other means.

Cloud service system 102 then transfers a notification back to user system 101 at step 3 to direct user system 101 to SSO service system 104 for authentication. In this particular example, it is further determined that user system 101 should be directed to SSO service system 104 through SSO proxy system 103. This determination may be made using executable code within cloud service system 102 that is configured to direct system 102 to use SSO proxy system 103 for access to certain accounts. This executable code may be placed in cloud service system 102 using features already available to third party account administrators. Therefore, cloud service system 102 directs user system 101 to SSO proxy system 103. This direction may be performed by providing user system 101 with a network address of SSO proxy system 103 rather than SSO service system 104. Thus, when user system 101 responsively transfers an authentication request directed to SSO service system 104 at step 4, user system 101 is actually directing the authentication request to SSO proxy system 103.

Upon receiving the authentication request from user system 101, SSO proxy system 103 determines whether the authentication request satisfies criteria for allowing access to cloud service system 102 at step 5. In particular, the authentication request may indicate a location from where the request was sent (e.g. an IP address from which a geographic location can be derived, which may be in a header portion of the request), may indicate the cloud service being accessed (e.g. via a URL or other identifier for the cloud service of cloud service system 102), may indicate the device type (e.g. the URL for the cloud service may differ depending on which device is accessing the service), whether the cloud service is being accessed via an application for the service or via a website, or any other information that may be available in a request to SSO service system 104 to authenticate user system 101. In other words, it is not necessary for the authentication request to include information other than what would normally be included in an authentication request transferred to SSO service system 104.

Even if SSO service system 104 does not base its authentication upon the information listed above, SSO proxy system 103 uses the information determine whether SSO proxy system 103 should even have the opportunity to authenticate user system 101 at step 5. Specifically, in this example, SSO proxy system 103 maintains criteria for accessing the account on cloud service system 102 into which user system 101 is requesting access. That criteria limits where user device 101 can be located to access the account, times in which user system 101 can access the account, and what type of device can access the account. In some cases, two or more criterion may depend on the other. For example, only certain device types may be able access the cloud service in certain locations.

If SSO proxy system 103 determines that the authentication request does not satisfy the criteria, then the authentication request is not passed on to SSO service system 104 and user device 101 is therefore not allowed to access cloud service system 102. Alternatively, if SSO proxy system 103 determines that the authentication request does satisfy the criteria, the authentication request is passed on to SSO service system 104 at step 6. Upon receiving the authentication request, SSO service system 104 treats the request just like any other authentication request that did not pass through SSO proxy system 103.

Advantageously, the embodiments described above allow for additional restrictions to be placed on accessing a cloud service via an associated SSO service. The SSO service system providing the SSO service does not need to be modified since the SSO proxy system does not effect the way in which an authentication request in processed once received by the SSO service system. Moreover, the cloud service requires little to no modification aside from including instructions to direct certain access requests to an SSO proxy system, which can be implemented using features of the cloud service that are already accessible to account administrators.

Referring back to FIG. 1, user system 101 comprises a computer system and a communication interface. User system 101 may also include a user interface, memory device, software, processing circuitry, or some other communication components. User system 101 may be a telephone, tablet, computer, e-book, mobile Internet appliance, wireless network interface card, media player, game console, or some other end user computing apparatus—including combinations thereof.

Cloud service system 102 comprises a computer system and communication interface. Cloud service system 102 may also include other components such as a router, server, data storage system, and power supply. Cloud service system 102 may reside in a single device or may be distributed across multiple devices. Cloud service system 102 could be an application server, a personal workstation, a service node, or some other network capable computing system—including combinations thereof.

SSO proxy system 103 comprises a computer system and communication interface. SSO proxy system 103 may also include other components such as a router, server, data storage system, and power supply. SSO proxy system 103 may reside in a single device or may be distributed across multiple devices. SSO proxy system 103 is shown externally to SSO service system 104, but system 103 could be integrated within the components of SSO service system 104. SSO proxy system 103 could be an application server, a personal workstation, a service node, or some other network capable computing system—including combinations thereof.

SSO service system 104 comprises a computer system and communication interface. SSO service system 104 may also include other components such as a router, server, data storage system, and power supply. SSO service system 104 may reside in a single device or may be distributed across multiple devices. SSO service system 104 could be an application server, a personal workstation, a service node, or some other network capable computing system—including combinations thereof.

Communication links 110-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 110-112 could be direct links or may include intermediate networks, systems, or devices.

FIG. 4 illustrates computing environment 400 in which a SSO proxy regulates access to a cloud service. Computing environment 400 includes workstation 401, smartphone 402, SSO proxy system 403, SSO system 404, cloud service system 405, cloud service system 406, and communication network 407. Workstation 401 is a user system located at geographic location 421. Smartphone 402 is a user system located at geographic location 422. Systems 401-406 and communication network 407 communicate over communication links 411-416, respectively.

Communication network 407 comprises network elements that provide communications services. Communication network 407 may comprise switches, wireless access nodes, Internet routers, network gateways, application servers, computer systems, communication links, or some other type of communication equipment—including combinations thereof. Communication network 407 may be a single network (e.g. local area network, wide area network, the Internet, etc.) or may be a collection of networks. For example, SSO proxy system 403 and SSO system 404 may be located on the same local area network that communicates with other systems through the Internet.

In operation, cloud service system 405 and cloud service system 406 are both associated with SSO system 404. Therefore, users of both can use SSO system 404 to authenticate themselves for access to cloud service system 405 and cloud service system 406. For the purposes of this example, it is assumed that attempts to authenticate using SSO system 404 will allow access to both cloud service system 405 and cloud service system 406, should the user desire access to both. SSO system 404 may use any type of SSO configuration including Kerberos, smart card, Windows Authentication, Security Assertion Markup Language (SAML), or some other arrangement—including combinations thereof.

Figure 5:
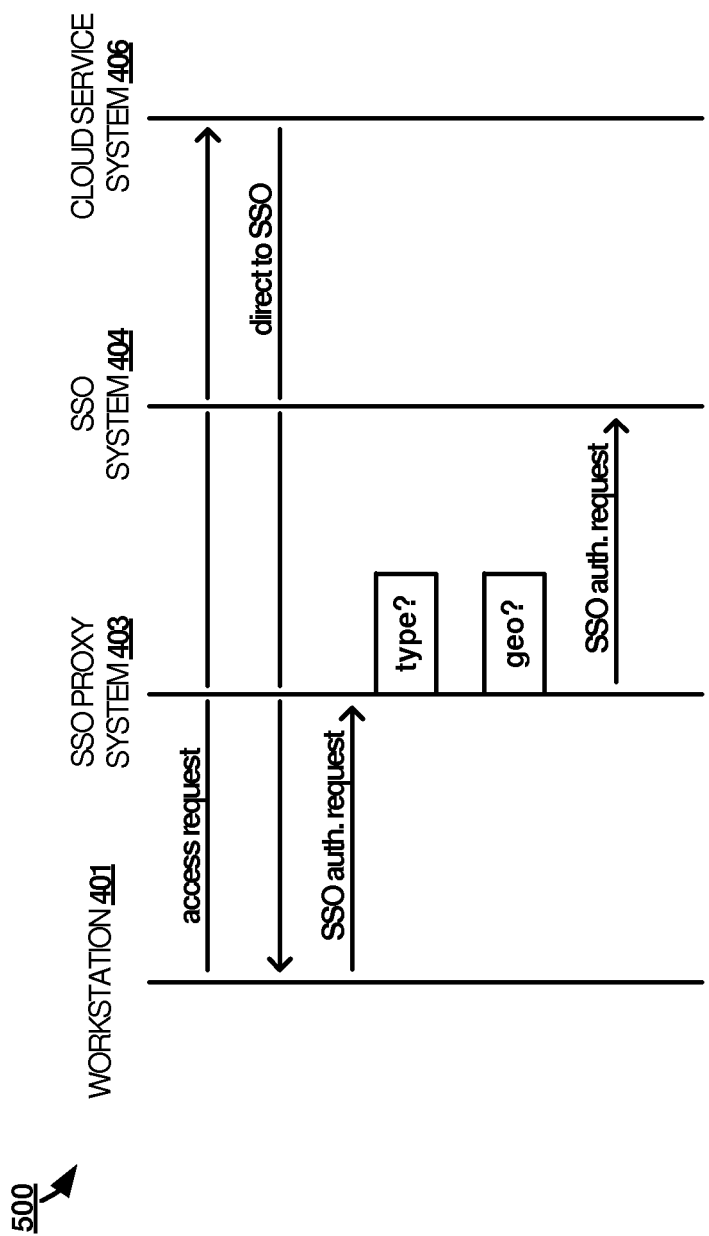
FIG. 5 illustrates an operational scenario for using a single sign-on proxy to regulate access to a cloud service.

FIG. 5 illustrates operational scenario 500 of computing environment 400 to regulate access to a cloud service. A user directs workstation 401 to access cloud service system 406 and workstation 401 responsively requests access to cloud service system 406. The access may be requested through a website hosted by cloud service system 406 and displayed by a browser of workstation 401, may be requested via an application executing on workstation 401 for accessing the service of cloud service system 406, or may be requested in some other manner.

In response, to the request of workstation 401 to access cloud service system 406, cloud service system 406 directs workstation 401 to use SSO system 404. In some cases, such as examples where cloud service system 406 is accessed via a website presented at workstation 401, the user may provide input to workstation 401 to indicate to cloud service system 406 that the user wishes to use SSO system 404. In other cases, cloud service system 406 may automatically determine that workstation 401 should be directed to use SSO system 404. In one example, cloud service system 406 may be configured to direct all access requests to SSO system 404, as may be the case if cloud service system 406 only serves users of one entity. It should be understood that methods of directing workstation 401 to use SSO system 404, other than those described above, may also be used.

Once directed to use SSO system 404, workstation 401 transfers an authentication request to SSO system 404. The authentication request requests SSO system 404 to authenticate workstation 401 to access cloud service system 406 on behalf of the user of workstation 401. In this example, SSO proxy system 403 is situated on communication network 407 such that any communications directed to SSO system 404 pass through SSO proxy system 403. Accordingly, SSO proxy system 403 intercepts the authentication request before it reaches SSO system 404. Traffic other than authentication requests from user systems may pass through SSO proxy system 403 without obstruction.

Upon intercepting the authentication request, SSO proxy system 403 determines whether the authentication request should be forwarded to SSO system 404. In this particular example, the criteria for whether the user of workstation 401 should be allowed to access cloud service system 406 depends upon a type of device the user is using to access cloud service system 406 and the geographic location where the device is located. Each criterion of the criteria does not depend upon the other and, therefore, the authentication request from workstation 401 must satisfy both in order to be forwarded to SSO system 404.

SSO proxy system 403 determines that workstation 401 is a device type that satisfies the device type criterion. The type of device may be identified based on information included in the authorization request that identifies workstation 401 as a workstation. Likewise, SSO proxy system 403 determines that workstation 401 is located at an allowed geographic location, geographic location 421 in this instance. In some cases, SSO proxy system 403 may determine geographic location 421 of workstation 401 based on a network address included in the authentication request. Specifically, SSO proxy system 403 may identify the network address (e.g. Internet Protocol address) of workstation 401 or of an intermediate system through with the authentication request passed on its way to SSO proxy system 403. SSO proxy system 403 may then identify a geographic location associated with that network address from a data structure that stores network addresses that originate in certain geographic locations. In alternative examples, a network address alone, and not an associated geographic location, may be used to determine whether a criterion is satisfied. In those cases, the criterion may indicate a list of network addresses that are allowed or a list of network addresses that are not allowed. Thus, the criterion would be satisfied if the network address in the authentication request is either on the allowed list or not on the disallowed list, respectively. The network addresses may include portions of network addresses, such as address prefixes, rather than entire network addresses.

Since the authentication request from workstation 401 satisfies all of the criteria placed on authentication requests, the authentication request is forwarded on to SSO system 404. SSO system 404 receives the forwarded authentication request without knowledge that SSO proxy system 403 first intercepted the authentication request. SSO system 404 then performs its functions to authenticate workstation 401 and its user to access cloud service system 406 in the same manner it would if SSO proxy system 403 did not intercept the authentication request. Moreover, since SSO system 404 is a SSO system, in this example workstation 401 will also be allowed access to cloud service system 405.

Figure 6:
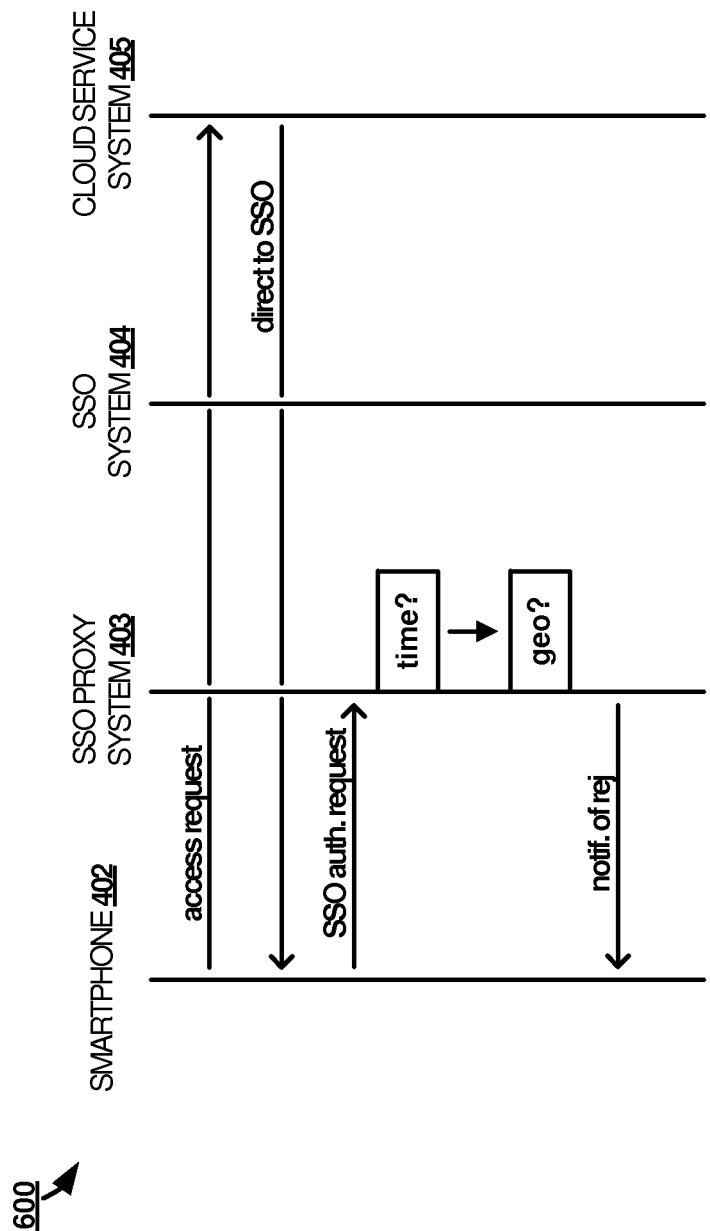
FIG. 6 illustrates another operational scenario for using a single sign-on proxy to regulate access to a cloud service.

FIG. 6 illustrates operational scenario 600 of computing environment 400 to regulate access to a cloud service. In this example, a user of smartphone 402 is attempting to access cloud service system 405 using smartphone 402. Smartphone 402 is directed to transfer an authentication request to SSO system 404 in a similar manner to workstation 401 in scenario 600. As in scenario 500, SSO proxy system 403 intercepts the authentication request from smartphone 402. However, in scenario 600, the two criterion that SSO proxy system 403 uses to determine whether the authentication request should be forwarded to SSO system 404 depend upon the other. Specifically, the allowed geographic locations depend upon the type of device that transferred the authentication request. The geographic locations that satisfy the criterion may therefore differ between different types of devices.

Accordingly, when SSO proxy system 403 receives the authentication request from smartphone 402, SSO proxy system 403 first determines what type of device transferred the request. Once SSO proxy system 403 determines that smartphone 402 is a smartphone, SSO proxy system 403 then determines whether the authentication request comes from a geographic location that is allowed for smartphones. In this case, geographic location 422 is not allowed to access cloud service system 405, or any other cloud service system associated with SSO system 404. As such, the criteria for passing smartphone 402's authentication request onto SSO system 404 is not satisfied by the authentication request from smartphone 402.

In addition to not forwarding the authentication request to SSO system 404 due to the authentication request not satisfying the criteria, SSO proxy system 403 sends a notification back to smartphone 402 indicating that the authentication request was not allowed to reach SSO system 404. The notification may further indicate a reason for why the authentication request was not forwarded to SSO system 404. In this example, that reason is that geographic location 422 is not an allowed geographic location. Upon receiving the notification, smartphone 402 may further notify its user (e.g. with a screen display, alert tone, and/or some other user interface action) that the authorization request was not passed to SSO system 404. Regardless of whether smartphone 402 or its user is notified, since SSO system 404 never receives the authentication request, SSO system 404 never gets the opportunity to authenticate smartphone 402.

Thus, even if smartphone 402, at the direction of its user or otherwise, would have been able to provide correct login credentials to SSO system 404, SSO proxy system 403 prevented SSO system 404 from being able to authenticate those credentials, which prevented smartphone 402 from accessing cloud service system 405 or any other cloud service associated with the user and SSO system 404. As such, SSO proxy system 403 provided a level of scrutiny to the authentication request beyond mere login credentials.

In either of scenarios 500 and 600, SSO proxy system 403 may transfer an instruction to SSO system 404 that logs workstation 401 or smartphone 402 out of all cloud services associated with SSO system 404 should one or more criterion no longer be satisfied. For example, if the authentication request from smartphone 402 was received during an allowed period of time, smartphone 402 may be logged out once that period of time is over.

Figure 7:
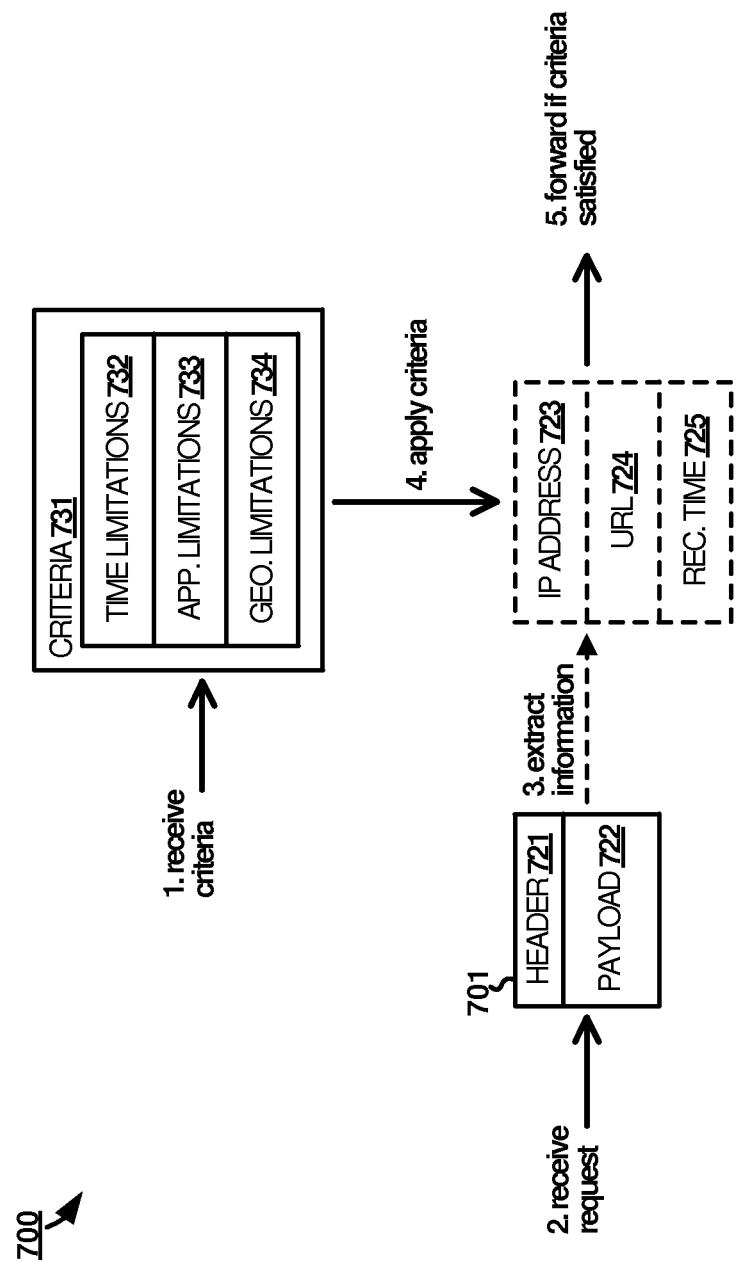
FIG. 7 illustrates a further operational scenario for using a single sign-on proxy to regulate access to a cloud service.

FIG. 7 illustrates operational scenario 700 of SSO proxy system 403 to regulate access to a cloud service. For the purposes of this example, workstation 401 is requesting access to the cloud service provided by cloud service system 405. At step 1, criteria 731 is received by SSO proxy system 403. Criteria 731 includes three criteria components, time limitations 732, application limitations 733, and geographic limitations 734. Criteria 731 may be received as user input directly from a user into SSO proxy system 403, received from another system over communication network 407 (after being input into that other system by a user or otherwise), preinstalled by a manufacturer of SSO proxy system 403, or from some other source. In some examples, the receipt of criteria 731 may be done for the purposes of updating a previous version of criteria 731. While it may be possible for criteria 731 to be received after an authentication request is received, waiting until after the authentication request to receive criteria 731 may result in unwanted delay in processing the authentication request, which thereby also delays SSO system 404's ability to authenticate the request should the request be forwarded to SSO system 404.

At step 2, an authentication request is received as data packet 701 from workstation 401. While the authentication request in this example comprises a single data packet, it should be understood that the authentication request in other examples may comprise multiple data packets. Regardless, SSO proxy system 403 processes data packet 701 at step 3 to extract information pertinent to criteria 731. In this case, that information includes IP address 723, URL 724, and received time 725. Each item of information 723-725 may be extracted from one or more header fields of packet header 721, through inspection of payload 722, or derived from SSO proxy system 403 itself, as may be the case when determining when data packet 701 was received by SSO proxy system 403 (i.e. received time 725).

SSO proxy system 403 applies criteria 731 to the extracted information 723-725 at step 4. Each component 732-734 is applied independently for this example, although in other examples, one or more of components 732-734 may be dependent upon at least one other component. For example, the time limitations 732 may be different depending on the geographic location from which data packet 701 was received, as defined by geographic limitations 734.

SSO proxy system 403 determines a geographic location from which data packet 701 originated, or through which data packet 701 was transferred, based on an association between IP address 723 and the geographic location. Geographic limitations 734 are then applied to the determined geographic location. Likewise, SSO proxy system 403 applies time limitations 732 to received time 725 to determine whether data packet 701 satisfies time limitations 732.

URL 724 indicates to SSO proxy system 403 a version of the cloud service requested by the authentication request. In particular, the URL is the URL used by workstation 401 to contact cloud service system 405. In this example, cloud service system 405 receives service requests via different URLs depending on how cloud service system 405 is being accessed. For instance, a first URL may be used to access a desktop version of the cloud service via a web browser, a different second URL may be used to access a mobile optimized version of the cloud service via a web browser (as would likely be used by a mobile device web browser), and yet another different third URL may be used by third party applications to access the cloud service (yet more URLs may be used to further differentiate between different third party applications). It should be understood, that any number of different URLs may be used to differentiate different possible manners of accessing the cloud service provided by cloud service system 405.

Accordingly, SSO proxy system 403 applies application limitations 733 to URL 724 to determine whether the application on workstation 401 that is attempting to access cloud service system 405 satisfies the criteria 731. Application limitations 733 may define allowed or prohibited URLs explicitly or may define allowed or prohibited applications, either specifically (e.g. a particular application by a particular developer) or by application type (e.g. native web browser, third party browser, third party service specific application, etc.), in some other manner and then rely on SSO proxy system 403 to translate those definitions into URLs that may be indicated by URL 724. Additionally, while a URL is used to indicate an application, either specifically or by application type, other manners of identifying the application requesting access to cloud service system 405 may also be used.

Each criteria component 732-734 may be applied sequentially, in parallel, or some combination thereof. If one criteria component is not satisfied to the extent that data packet 701 should not be forwarded to SSO system 404, as opposed to either being fully satisfied or satisfied to the extent that another criteria component depends upon that satisfaction (e.g. different time limitations applying to different device types), then the application of criteria 731 may be stopped as the satisfaction of other criteria components is no longer relevant.

If data packet 701 satisfies each criteria component 732-734, and thereby criteria 731 as a whole, then data packet 701 is forwarded to SSO system 404 at step 5 so that SSO system 404 can perform its authentication process. Otherwise, data packet 701 is not forwarded to SSO system 404 and, in some cases, SSO proxy system 403 transfers a notification of such back to workstation 401.

Figure 8:
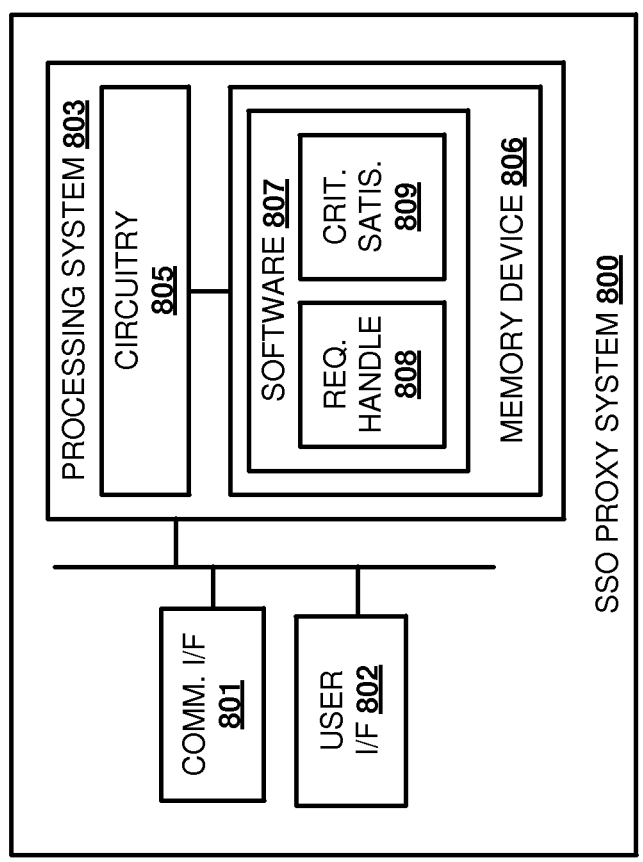
FIG. 8 illustrates a SSO proxy system for regulating access to a cloud service.

FIG. 8 illustrates SSO proxy system 800. SSO proxy system 800 is an example of SSO proxy system 103, although system 103 may use alternative configurations. SSO proxy system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes request handling module 808 and criteria satisfaction module 809. Operating software 807 may further include an operating system, utilities, drivers, network interfaces, applications, or some other type of software. When executed by circuitry 805, operating software 807 directs processing system 803 to operate SSO proxy system 800 as described herein.

In particular, request handling module 808 directs processing system 803 to receive an authentication request from a user system directed to a SSO service. Criteria satisfaction module 809 directs processing system 803 to determine whether the authentication request satisfies at least one criterion for allowing access to the cloud service associated with the SSO service. Upon determining that the authentication request satisfies the at least one criterion, request handling module 808 directs processing system 803 to forward the authentication request to the SSO service.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of regulating access to a cloud service using a single sign-on (SSO) proxy, the method comprising:
   in the SSO proxy:
   receiving an authentication request from a user system directed to a SSO service;
   in response to receiving the authentication request, determining whether the authentication request satisfies at least one criterion for allowing access to the cloud service associated with the SSO service, wherein determining whether the authentication request satisfies at least one criterion comprises determining whether the authentication request was received from a geographic location that satisfies a geographic location limitation included in the at least one criterion and determining whether the authentication request was received at a time that satisfies a time limitation included in the at least one criterion;
   upon determining that the authentication request satisfies the at least one criterion, forwarding the authentication request to the SSO service;
   after the SSO service authenticates the authentication request, determining that the at least one criterion is no longer satisfied; and
   upon determining that the at least one criterion is no longer satisfied, transferring a sign-off request to the SSO service.

2. The method of claim 1, wherein determining whether the authentication request was received from a geographic location that satisfies the geographic location limitation comprises:
   identifying a network address from which the authentication request was received; and
   identifying the geographic location associated with the network address.

3. The method of claim 1, wherein the at least one criterion includes a device type limitation, and the method further comprises:
   determining whether the user system satisfies the device type limitation.

4. The method of claim 1, wherein the at least one criterion includes an application limitation, and the method further comprises:
   determining whether a Uniform Resource Locator (URL) included in the authentication request satisfies the application limitation.

5. The method of claim 1, wherein the at least one criterion comprises a first criterion upon which satisfaction of a second criterion depends.

6. The method of claim 1, further comprising:
   upon determining that the authentication request does not satisfy the at least one criterion, transferring a notification to the user system indicating that the authentication request was not forwarded to the SSO service.

7. The method of claim 6, wherein the notification further indicates a reason that the authentication request was not forwarded to the SSO service.

8. A single sign-on (SSO) proxy system for regulating access to a cloud service, the SSO proxy system comprising:
   a communication interface configured to receive an authentication request from a user system directed to a SSO service;
   a processing system configured to, in response to the communication interface receiving the authentication request, determine whether the authentication request satisfies at least one criterion for allowing access to the cloud service associated with the SSO service, wherein to determine whether the authentication request satisfies at least one criterion the processing system determines whether the authentication request was received from a geographic location that satisfies a geographic location limitation included in the at least one criterion and determines whether the authentication request was received at a time that satisfies a time limitation included in the at least one criterion;
   the communication interface further configured to, upon determining that the authentication request satisfies the at least one criterion, forward the authentication request to the SSO service;
   the processing system further configured to, after the SSO service authenticates the authentication request, determine that the at least one criterion is no longer satisfied; and
   the communication interface further configured to, upon the processing system determining that the at least one criterion is no longer satisfied, transfer a sign-off request to the SSO service.

9. The SSO proxy of claim 8, wherein the processing system configured to determine whether the authentication request was received from a geographic location that satisfies the geographic location limitation comprises:
   the processing system configured to identify a network address from which the authentication request was received and identify the geographic location associated with the network address.

10. The SSO proxy of claim 8, wherein the at least one criterion includes a device type limitation, and the SSO proxy further comprises:
    the processing system configured to determine whether the user system satisfies the device type limitation.

11. The SSO proxy of claim 8, wherein the at least one criterion includes an application limitation, and the SSO proxy further comprises:
    the processing system configured to determine whether a Uniform Resource Locator (URL) included in the authentication request satisfies the application limitation.

12. The SSO proxy of claim 8, wherein the at least one criterion comprises a first criterion upon which satisfaction of a second criterion depends.

13. The SSO proxy of claim 8, further comprising:
    the communication interface configured to transfer a notification to the user system indicating that the authentication request was not forwarded to the SSO service upon determining that the authentication request does not satisfy the at least one criterion.

14. A non-transitory computer readable storage medium having instructions stored thereon for regulating access to a cloud service, the instructions, when executed by a single sign-on (SSO) proxy system, direct the SSO proxy system to:
    receive an authentication request from a user system directed to a SSO service;
    in response to receiving the authentication request, determine whether the authentication request satisfies criteria for allowing access to the cloud service associated with the SSO service, wherein to determine whether the authentication request satisfies at least one criterion the instruct the SSO proxy system to determine whether the authentication request was received from a geographic location that satisfies a geographic location limitation included in the at least one criterion and determine whether the authentication request was received at a time that satisfies a time limitation included in the at least one criterion;
    upon determining that the authentication request satisfies the criteria, forward the authentication request to the SSO service;
    after the SSO service authenticates the authentication request, determine that the at least one criterion is no longer satisfied; and
    upon determining that the at least one criterion is no longer satisfied, transfer a sign-off request to the SSO service.

* * * * *